United States Patent [19]

Cartwright et al.

[11] 4,095,487

[45] Jun. 20, 1978

[54] POWER TRANSMISSION DRIVELINE UNIT

[75] Inventors: Bert W. Cartwright, Mt. Clemens; Dugald Cameron, Grosse Pointe Woods; James A. Hagaman, Madison Heights; Robert A. Hoetger, St. Clair Shores; Uno Kuusik, Royal Oak; William Nortman, Grosse Pointe, all of Mich.

[73] Assignee: Chrysler Corporation, Highland Park, Mich.

[21] Appl. No.: 713,460

[22] Filed: Aug. 11, 1976

[51] Int. Cl.² .................... F16H 37/08; F16H 57/10
[52] U.S. Cl. ...................................... 74/695; 74/763
[58] Field of Search ............... 74/694, 695, 700, 701, 74/753, 763

[56] References Cited

U.S. PATENT DOCUMENTS

| 3,035,455 | 5/1962 | Peras | 74/700 X |
| 3,095,764 | 7/1963 | Peras | 74/695 |
| 3,614,902 | 10/1971 | Candellero | 74/695 |
| 3,648,544 | 3/1972 | Tanaka | 74/695 |
| 3,797,332 | 3/1974 | Cameron et al. | 74/763 |
| 3,859,872 | 1/1975 | Clauss, Jr. | 74/763 |
| 3,924,491 | 12/1975 | Kalversberg | 74/763 |
| 3,977,272 | 8/1976 | Neumann | 74/695 X |

FOREIGN PATENT DOCUMENTS 1,177,949  9/1964  Germany .............................. 74/695

Primary Examiner—Samuel Scott
Assistant Examiner—Lance W. Chandler
Attorney, Agent, or Firm—Baldwin & Newtson

[57] ABSTRACT

Automatic Power Transmission apparatus having output members extending in opposite directions to and generally parallel to the axis of rotation of the engine crankshaft. A transfer shaft has a gear on opposite ends thereof to transfer the output of one portion of the drive train back to another portion of the drive train which is located in general planar alignment with the input to the apparatus.

3 Claims, 4 Drawing Figures

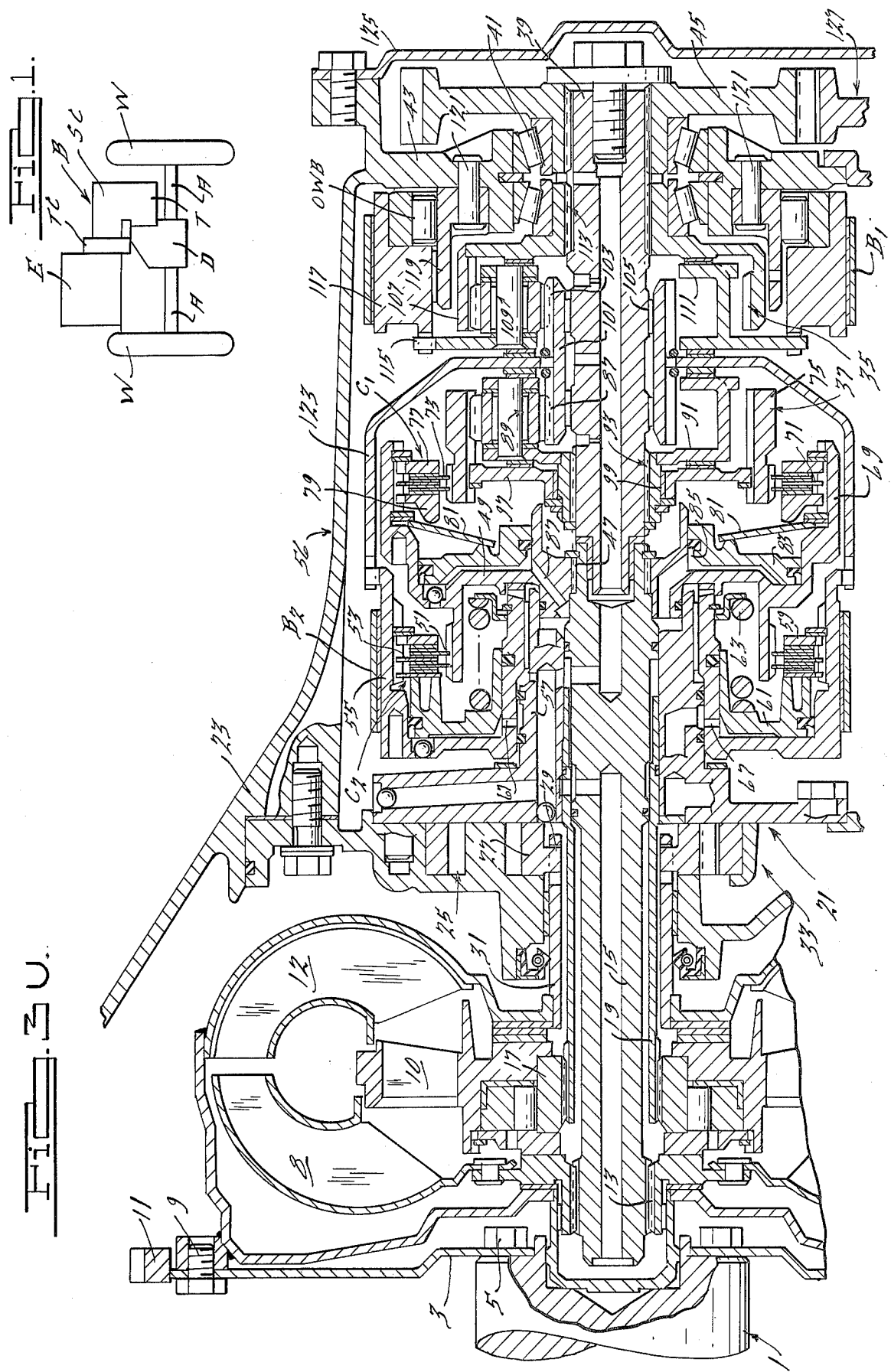

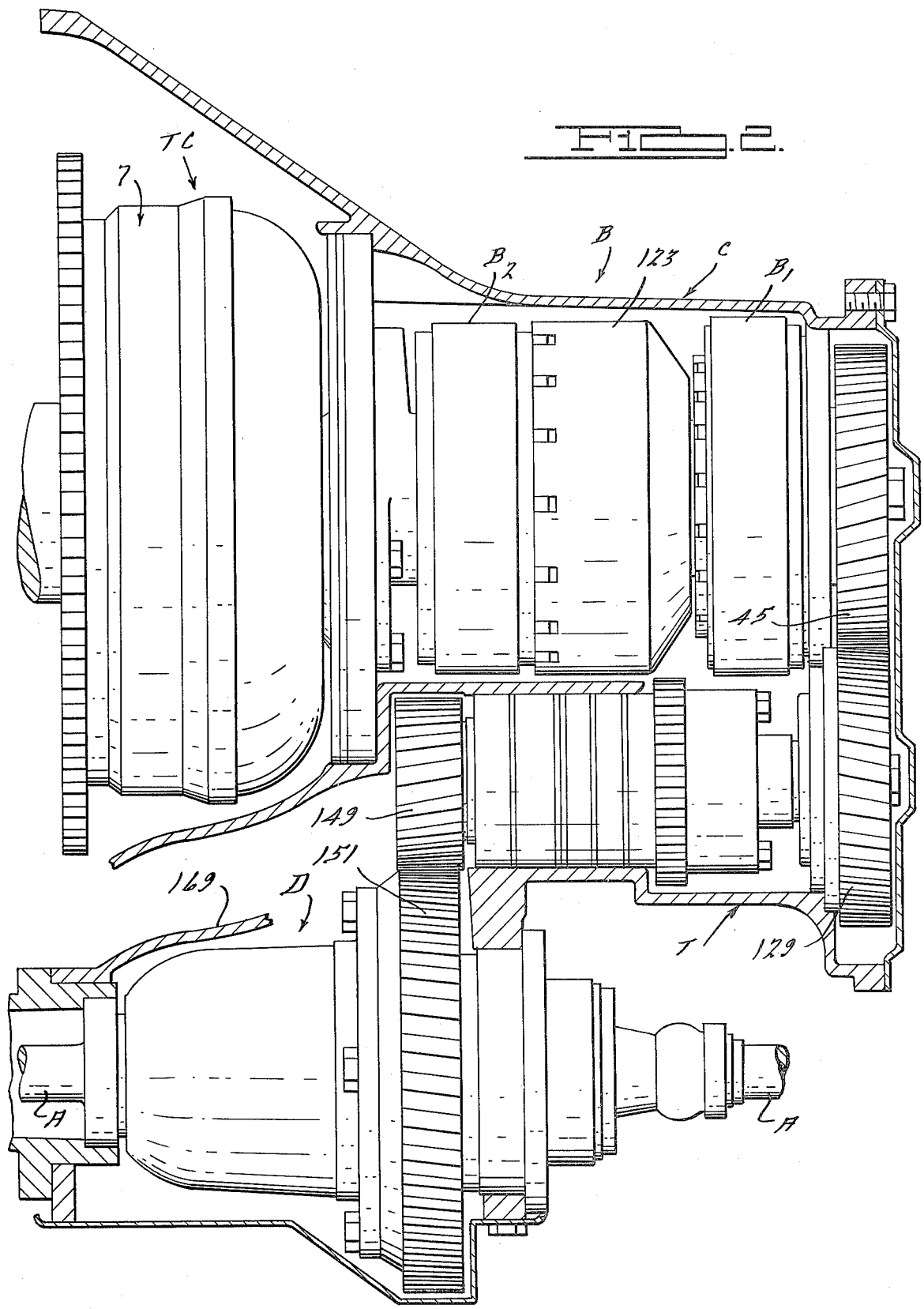

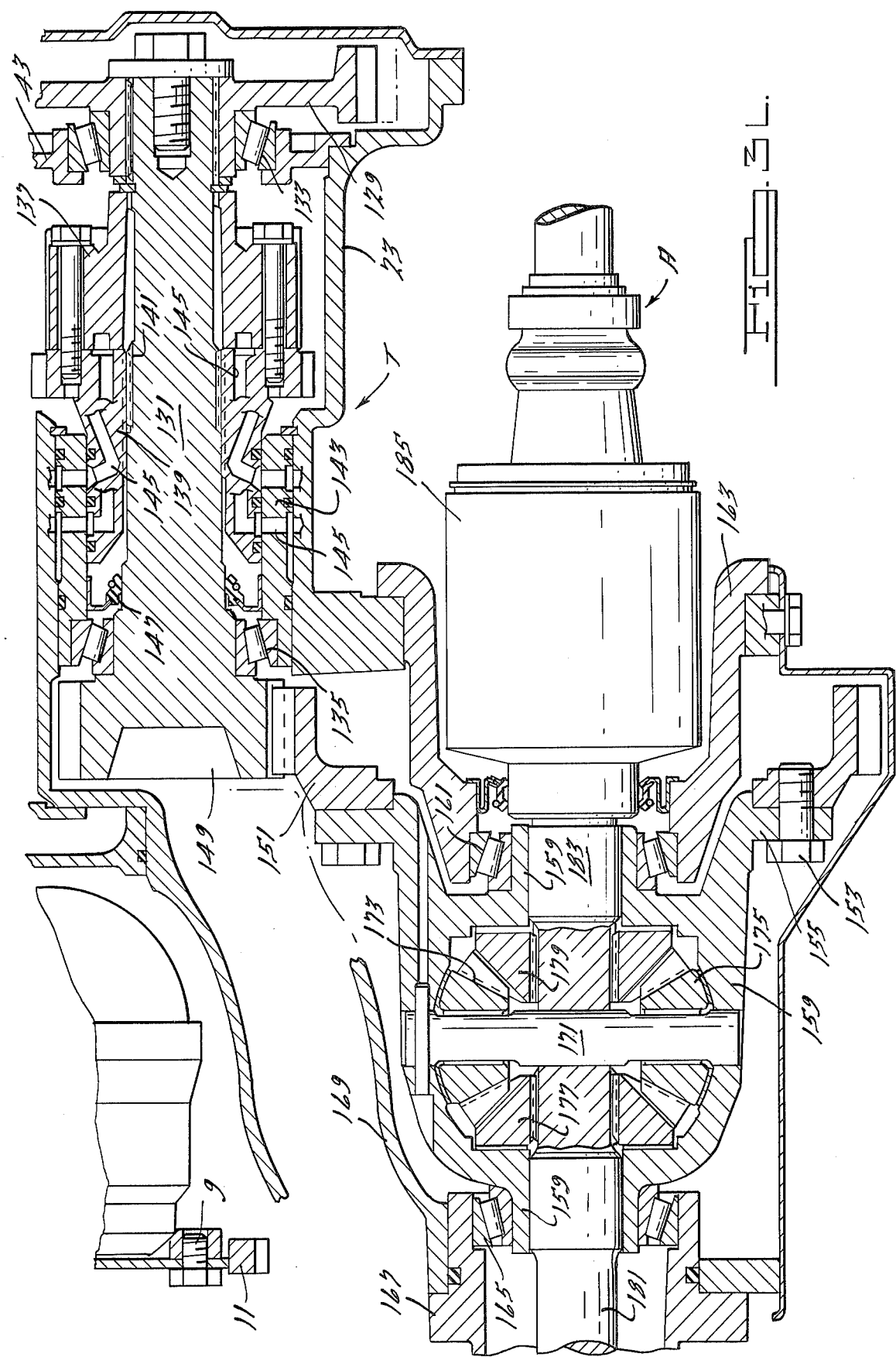

POWER TRANSMISSION DRIVELINE UNIT

BACKGROUND OF THE INVENTION

This invention relates to a power transmission driveline unit for motor vehicles, and more prticularly to an automatic power transmission for a transaxle driveline arrangement for a vehicle in which the engine and the power output shafts which rotate the wheels extend in a direction generally transverse to the length of the vehicle. Such arrangements are used in vehicles having a forwardly mounted engine with front wheel drive or a rearwardly mounted engine with rear wheel drive.

SUMMARY OF THE INVENTION

Briefly, this invention comprises an automatic power transmission transaxle driveline unit for a motor vehicle.

One of the primary objects of this invention is to porvide a three forward speed and reverse drive motor vehicle transmission adapted for use with an engine which extends transversely of the vehicle.

Another object of the invention is to provide a transmission of the type described which extends transversely of the vehicle, and includes drive portions which extend in opposite directions;

A further object of this invention is to provide an automatic transmission such as described which is compact and adaptable to a multiplicity of different transversely extending engines;

Still another object of the present invention is the provision of an automatic transmission of the class described which is simple and economical in construction and efficient in operation.

Other objects and advantages of this invention will be made apparent as the description progresses.

BRIEF DESCRIPTION OF THE DRAWINGS

In the accompanying drawings in which one of various possible embodiments in illustrated, FIG. 1 is a schematic front elevational view of a motor vehicle drive train which includes an automatic power transmission unit embodying this invention;

FIG. 2 is an elevational view of a power transmission unit constructed in accordance with this invention with the case thereof broken away and shown in section for clarity; and FIGS. 3U and 3L are enlarged sectional views of the upper and lower portions of FIG. 2 and should be considered together as two portions of one view.

Like parts are indicated by corresponding reference characters throughout the several views of the drawings.

DESCRIPTION OF THE PREFERRED EMBODIMENT

FIG. 1 of the drawings diagrammatically discloses a motor vehicle power plant and drive train comprising an internal combustion engine E mounted transversely of a vehicle between two wheels W, which wheels may be the front or rear wheels. The engine E is drivingly connected to a power transmission unit which includes a hydrokinetic type of torque converter device TC drivingly connected to a change speed gearbox B having a speed change section SC and a transfer section T. The output from the gearbox B is connected to a differential unit D which is drivingly attached to axles A attached to the wheels W.

FIGS. 2, 3U and 3L disclose the flow of power through the transmission unit that comprises torque converter TC, box B and differential D in a series connected drive transmitting relationship. The end portion of a driving member, such as the crankshaft of the engine E of the motor vehicle is indicated at 1. The shaft is drivingly connected to a drive transmitting ring 3 by fasteners 5 and the ring is connected to a torque converter casing 7 by bolts 9. An engine starter ring 11 is mounted on and extends around the periphery of drive ring 3.

The torque converter casing 7 contains the conventional turbine 8 and stator or reaction member 10 as well as the impeller 12, with the impeller 12 being integrally connected to the casing 7 and the turbine member 8 being drivingly connected by a hub 13 to a shaft 15. The stator or reaction member 10 is connected by a one-way brake device (having an inner hub 17) to an axial sleeve 19 secured to a wall or partition 21 attached to the interior of a housing 23. The construction of a torque converter of this type is well known and a detailed description of such construction or the operation thereof is unnecessary.

A gear type hydraulic pump 25 having a driving gear 27 is directly connected by a key 29 to the rearwardly projecting end of an axially extending sleevelike flange portion 31 of torque converter casing 7. The pump 25 draws fluid from a supply sump (not shown) through a conduit 33 and circulates fluid through the converter TC, the transmission lubricating system and the various hydraulically operated control mechanisms associated with this power transmission.

The gearbox B includes the forward drive clutch $C_1$, the direct drive clutch $C_2$ and a pair of planetary gear trains 35 and 37 which are adapted to cooperate with the torque converter device TC to provide means for the transmission of three forward drives and a reverse drive to a speed change section output shaft 39. The forward drive clutch $C_1$ is engaged whenever any of the three forward speed is being utilized, and is disengaged when the transmissions controls are set in either Neutral or Reverse. The direct drive clutch $C_2$ is engaged only when the third Direct Forward Speed is being transmitted and whenever Reverse drive is being transmitted. The different clutches and brakes that are applied for transmitting the several drive ratios obtainable with this transmission are set forth in the chart below.

| Drive Ratio: | Members Applied: |
| --- | --- |
| Low (first) | $C_1$ and $B_1$ or $O.W.B._1$ |
| Kickdown (second) | $C_1 B_2$ |
| Direct (third) | $C_1 C_2$ |
| Reverse | $C_2 B_1$ |

The gear box includes the housing 23 which may be considered to include the upper and lower portions, the speed change section SC and the transfer section T. In the front portion of the speed change section are located the clutches $C_1$ and $C_2$ and one planetary gear set 37 whereas the rear portion of the speed change section houses the planetary gear set 35 and an overrunning clutch $O.W.B._1$. The rear end of the converter driven gear box input shaft 15 pilots the forward end of the speed change section output shaft 39. Output shaft 39 has its rear end portion journalled in a bearing 41 located in the rear wall 43 of the speed change section. A speed change section output gear 45 is secured to the rearward end of shaft 39 for transferring the drive from the speed change section to the transfer section T. Section T will be described in detail hereinafter.

Transmission input shaft 15 is drivingly connected at 47 to a spider element 49 which carries the friction clutch disc elements 51 of the Reverse and Direct Drive clutch $C_2$. The set of clutch discs 51 are adapted to be drivingly engaged with the use of clutch disc 53 which are drivingly connected to the interior surface of a brake drum 55. The brake drum 55 is journalled on the rearwardly projecting collar 57 on the gear box housing wall 21. A brake band $B_2$ is arranged to be selectively applied to the brake drum 55 to prevent rotation thereof. The brake drum mounts a backing plate 59 which cooperates with an axially shiftable piston 61 to effect drive transmitting engagement of the clutch discs 51 and 53. An angular spring 63 normally urges the piston 61 forwardly to clutch disengage position. Pressure fluid for operation of the clutch $C_2$ is supplied to the piston bore 65 for piston 61 through the conduit 67 which is connected to the hydraulically operated control system. The spider 49 also has a rearwardly extending clutch drum 69 at the periphery thereof. Clutch drum 69 has drivingly and shiftably mounted on its interior face one or more clutch discs 71. The clutch discs 71 are arranged to be drivingly engaged with the clutch discs 73 which are carried by the exterior surface of an annulus gear 75 of the forwardly arranged planetary gear set 37. Clutch discs 71 and 73 are arranged to be drivingly compressed against a backing plate 77 by a pressure plate member 79 actuated by a lever spring plate 81. Lever spring plate 81 is operated by a piston 83 which reciprocates in a cylinder bore 85 formed in the rear side of the spider element 49. Pressure fluid is supplied to the cylinder bore 85 through a conduit 87 connected to the hydraulically operated control system.

Arranged concentrically within the forward drive clutch $C_1$ is the forwardly located planetary gear set 37. This gear set comprise the annulus gear 75, a sun gear 87, planet pinion gearing 89 connecting gears 75 and 87, and a planet pinion gear carrier 91 which rotatably supports the pinion gearing. Carrier 91 is splined to the speed change output shaft 39 at 93. Annulus gear 75 is supported on an annular plate 97 rotatably mounted by bushing 99 on the hub portion of the carrier 91. The sun gear 87 is an integral part of a double sun gear sleeve 101, with the sun gear 87 being formed on the front end thereof and a sun gear 103 of the planetary gear set 35 being formed on the rear end thereof. Bearings 105 mount the sun gear sleeve 101 on the speed change section output shaft 39.

The rearwardly located gear set 35 includes the sun gear 103, and annulus gear 107, planet pinion gearing 109 which connects gears 103 and 107 and a planet pinion gear carrier 111 which rotatably supports pinion gearing 109. Annulus gear 107 is drivingly connected to the speed change section output shaft 39 by splines 113. Pinion gear carrier 111 is drivingly connected at 115 to a brake drum 117 adapted to be engaged by a brake band $B_1$. Brake drum 117 is rotatably mounted on an annular ledge 119 secured to the rear wall 43 of the housing 23 by fasteners 121. The brake drum 117 is restrained against reverse rotation, counterclockwise when looking from the left towards the right of the transmission, by means of a conventional one-way brake device $O.W.B._1$.

Inter-connection between the two axially spaced adjacent gear sets 35, 37 is by way of the common sun gear sleeve 101 and by way of the dual connections of the front carrier 91 and the rear annulus gear 107 to the common speed change section output shaft 39. The drum 55 is connected by bell-shaped member 123 to the sun gear sleeve 101.

An end cover plate 125 forms a chamber 127 at the end of the housing 23 opposite to the end in which the torque converter is located. Gear 45 on the end of the speed change section output shaft 39 drives a transfer gear 129 mounted on the end of the transfer shaft 131 located in the transfer section T of housing 23. The transfer gear 129 is rotatably supported by bearings 133 in wall 43. The other end of the transfer shaft 131 is rotatably supported by bearings 135 in a sleeve 143.

A governor valve body 137 of a hydraulic governor device which forms part of the hydraulic control system is mounted on the transfer shaft 131 by a governor support 139 which is splined to the transfer shaft 131 and is rotatably mounted within sleeve 143. Suitable porting 145 extends through the body 137, support 139 and sleeve 143 to provide for the flow of hydraulic fluid to and from the governor valve body 137. An annular seal 147 is mounted on the inside of sleeve 143 and engages the transfer shaft 131.

The end of transfer shaft 131 opposite to that which the transfer gear 129 is attached is formed as a gear 149. Gear 149 drives an annular ring-shaped gear 151 secured by fasteners 153 to an annular flange 155 on a two-piece differential case or carrier 159. Each of the two pieces of carrier 159 includes an annular collar 160 extending transversely with respect to the vehicle. A bearing 161 supports one collar 160 in a housing member 163 and a bearing 165 supports the other collar 160 in a tubular member 167 located in an opening in a housing 169. The two-piece carrier 159 forms a differential chamber through which a shaft 171 extends. Pinions 173 and 175 are rotatably mounted on shaft 171 and engage side gears 177 and 179 which are respectively splined to output shafts 181 and 183. The output shafts 181 and 183 may be coupled by universal joints, such as indicated at 185 to the axles A connected to the wheels W.

With the aforesaid drive arrangement when the transmission is set in Neutral by proper positioning of the transmission shift selector mechanism (not shown), the hydraulic control system of the transmission prevents the application of the brake bands $B_1$ and $B_2$. When the clutches $C_1$ and $C_2$ are disengaged, the torque converter-driven gearbox shaft 15 is disconnected from the planetary gear set 37 and from the gear sleeve 101 so there can be no drive input to either of the gear sets 35 and 37.

When the drive ratio selector mechanism (not shown) is set for initiation of drive in the Drive ratio the forward drive clutch $C_1$ is automatically engaged and this transmits drive to the annulus gear 75. Neither of the braking bands $B_1$ or $B_2$ nor the clutch $C_2$ is engaged at this time. The one-way brake $O.W.B._1$ prevents reverse rotation of the carrier 111 at this time and this one-way brake device provides the reaction for the compounded gear sets 35 and 37 which cooperate to transmit the one-way low or first speed forward drive to the speed change section output shaft 39. This low speed drive passes from the input shaft 15 through the engaged clutch $C_1$ and then to the annulus 75. Annulus gear 75 acts on the planet pinion gears 89 and causes rotation of the sun gear 87 backwards because the load on the speed change section output shaft 39 tends to anchor the planet pinion carrier 91 against rotation. Rotation of the sun gear 87 backwards rotates the sleeve 101 and the sun gear 103 backwards. The sun gear 103 rotating backwards acts on the planet pinions 109 and tends to rotate the pinion gear carrier 111 backwards because of the output shaft load on the annulus gear 107. Due to the one-way brake O.W.B.$_1$ the carrier 111 cannot be rotated backwards and the pinion gears 109 are then active to drive the ring gear 107 and connected speed change section output shaft 39 forwardly. Due to the connection of both the carrier 97 and the annulus gear 107 to the speed change section output shaft 39 and due to the anchoring of carrier 111 by the brake O.W.B.$_1$, at this time part of the torque of the input shaft 15 is transmitted directly to the speed change section output shaft 39 by the planetary gear set 37 and the other part of the input shaft torque is delivered to the speed change section output shaft 39 through the compounded gear sets 37 and 35. The starting Low drive when the transmission is set for Drive, or any other forward drive ratio for that matter, passes through both of the gear sets 37 and 35 with the reaction normally provided by the one-way brake device O.W.B.$_1$. Gear 45 on the end of speed change section output shaft 39 rotates with such output shaft and rotates transfer gear 129 and the transfer shaft 131 connected to such transfer gear. Gear 149 on the opposite end of transfer shaft 131 rotates the ring gear 151, thereby rotating the case 159 the output shafts 181 and 183 are rotated in accordance with well known differential principles by the side gears 177 and 179.

The governor 137 rotates with transfer shaft 131 for controlling the fluid pressure which is utilized by the control system (not shown) for actuating the various clutches and servo mechanisms. It will be noted that the construction described permits the differential mechanism to be generally aligned in a vertical plane with the torque converter TC and the transfer Section T to be generally aligned in a vertical plane with the speed change section SC, thus providing a compact construction.

When Second speed is to be attained by an upshift from starting low, it is merely necessary to apply braking band B$_2$ while the forward drive clutch C$_1$ remains engaged. This anchors the rotatable sleeve 101 that carries the sun gears 87 and 103. With sun gear 103 anchored, the planetary gear set 37 is activated to directly transmit a forward Second speed drive from annulus 75 to pinions 89 to the speed change output shaft 39 by way of the carrier 91. The planetary gear set 35 is inactive at this time and its pinion carrier 111 is driven forwardly which causes it to overrun the one-way brake device O.W.B.$_1$. Braking band B$_1$ and clutch C$_2$ remain disengaged when the transmission is conditioned for Second speed for drive. It will be noted that no braking band need be released on an upshift from Low to Second because the Second speed can lift off the one-way brake O.W.B$_1$ when band B$_2$ is applied to activate Second speed and likewise no braking band need be applied on an automatic downshift from Second to Low for the drive can drop down onto the one-way brake device O.W.B$_1$ as the band B$_2$ is released.

The output from speed change section output shaft 39 is transmitted by gears 45 and 129 to the transfer shaft 131 and then by gears 149 and 151 to the differential mechanism.

Third forward speed or direct drive is achieved by an up-shift from Second that results from the engagement of the direct drive clutch C$_2$ on the release of the band B$_2$. The forward drive clutch C$_1$ remains engaged when in third forward speed while bands B$_1$ and B$_2$ are each released. Engagement of the clutch C$_2$ while clutch C$_1$ is engaged connects the annulus gear 75 and the sun gear 87 of the planetary gear 37 and this locks up the gear set 37, thereby providing a direct 1:1 forward drive. Because of the interconnection of planetary gear set 37 with planetary gear set 35 by means of the sun gear sleeve 101 and the splines 113 for annulus 107, the two gear sets 35 and 37 are both locked up for the transmission of the third forward speed. The drive is then transmitted by the gears 45 and 129 to the transfer shaft 131.

Reverse drive is obtained by plaing the transmission selector lever (not shown) in a Reverse position. This action engages the clutch C$_2$ and applies the brake band B$_1$, while the clutch C$_1$ is disengaged and the braking band B$_2$ is released. With the clutch C$_1$ disengaged there is no drive input to the annulus gear 75. Drive input is from the input shaft 15 to the clutch C$_2$ and drum 123 to the sun gear sleeve 101. As the braking band B$_1$ is applied to the carrier 111 is anchored and the annulus 107 is driven in a backwards or reversed direction by the gear set 35. Accordingly, the direction of rotation of gear 45 is reversed and this reverse rotation is transmitted through the gear 129 and transfer shaft 131 to the differential and axles A.

It will be seen that an automatic transmission as described lends itself to a compact construction which is advantageous for small front wheel drive vehicles, for example. The transmission is in essence folded upon itself with the final components, such as the governor and output gear 149 being mounted on a transfer shaft extending back in the direction toward the torque converter to provide a differential drive arrangement located in approximately the same generally vertical planer area as the torque converter TC.

In view of the foregoing it will be seen that the other objects and advantages of this invention are achieved.

Although only one embodiment of the invention has been disclosed and described, it is apparent that other embodiments and modifications of the invention are possible.

We claim:

1. In an engine driven vehicle having an engine extending transversely with respect to the vehicle at one end thereof, a pair of wheels at the same end of said vehicle, and automatic drive transmission means connecting said engine to said wheels, said automatic drive transmission means including a housing attached to said vehicle, said housing having a torque converter section, a speed change section adjacent said torque converter section, a differential having portions located in generally vertically planar alignment with said torque converter section, and a transfer section having portions in generally vertically planar alignment with said speed change section, said engine having a crankshaft, a torque converter in said torque converter section of said housing rotatable on the same axis as said crankshaft and adapted to be driven by said engine crankshaft, said torque converter having a torque converter output shaft extending into said speed change section, an annular spider connected to said shaft, first and second sets of clutch discs drivingly connected to said shaft, a speed change section output shaft mounted in said speed change section, a sleeve having first and second sun gears thereon rotatably mounted on said speed change section output shaft, first drum means connected to said sleeve, a third set of clutch discs connected to said drum means and adapted to frictionally engage said first set of clutch discs, a first planet pinion carrier connected to said speed change output shaft and having first pinions engaging said first sun gear, a first annulus gear engaging said first pinions, a fourth set of clutch discs connected to said first annulus gear and adapted to frictionally engage said second set of clutch discs, a second planetary pinion carrier having second pinions engaging said second sun gear, second drum means connected to said second pinion carrier, a second annulus gear connected to said speed change section output shaft and engaged with said second pinions, first and second brakes for respectively engaging said first drum means and said second drum means, an output gear connected to said speed change section ohutput shaft, said speed change section output shaft and said output gear rotating on said axis, a transfer shaft rotatably mounted in said transfer section on an axis parallel to said axis, a first transfer gear engaged with said output gear and attached to said transfer shaft, a governor valve body attached to said transfer shaft, a second transfer gear on the other end of said transfer shaft adjacent said torque converter section, said differential including a carrier, said carrier having an annular gear thereon driven by said second transfer gear and rotatable on an axis parallel with the axis of said transfer shaft, said differential including pinions rotatable with said carrier and side gears driven by said pinions, said side gears being connected to axle means for driving said wheels, a first speed drive being transmitted to said axle means when said second and fourth sets of clutch discs are engaged and said second brake is applied, a second speed drive being transmitted to said axle means when said second and fourth sets of clutch discs are engaged and said first brake is applied, and a third speed drive being transmitted to said axle means when said second and fourth sets of clutch discs and said first and third clutch discs are engaged.

2. In an engine driven vehicle as set forth in claim 1 further including a governor support surrounding said transfer shaft, said support being splinted to said transfer shaft and connected to said governor valve body, a sleeve mounted in said housing and surrounding said governor support, and ports in said sleeve, support and body to provide passages for the flow of fluid to and from said governor valve body.

3. In an engine driven vehicle as set forth in claim 2 further including bearing means mounting the end of said transfer shaft adjacent said second transfer gear, and an annular seal surrounding said transfer shaft and mounted in said sleeve.

* * * * *